US008880325B2

(12) United States Patent
Perrie et al.

(10) Patent No.: US 8,880,325 B2
(45) Date of Patent: Nov. 4, 2014

(54) METHOD AND DEVICE FOR ENSURING THE ACCURACY AND THE INTEGRITY OF AN AIRCRAFT POSITION ON THE GROUND

(71) Applicant: Airbus Operations S.A.S., Toulouse Cedex 9 (FR)

(72) Inventors: Jean-Damien Perrie, Toulouse (FR); Philippe Gmerek, Toulouse (FR); Adrien Chen, Toulouse (FR)

(73) Assignee: Airbus Operations S.A.S. (FR)

( * ) Notice: Subject to any disclaimer, the term of this patent is extended or adjusted under 35 U.S.C. 154(b) by 132 days.

(21) Appl. No.: 13/654,569

(22) Filed: Oct. 18, 2012

(65) Prior Publication Data
US 2014/0136091 A1  May 15, 2014

(30) Foreign Application Priority Data

Oct. 27, 2011 (FR) ...................................... 11 59776

(51) Int. Cl.
| | |
|---|---|
| *G08G 5/06* | (2006.01) |
| *G06F 17/10* | (2006.01) |
| *G05D 1/02* | (2006.01) |
| *G08G 5/00* | (2006.01) |
| *G05D 1/00* | (2006.01) |
| *B64F 1/00* | (2006.01) |

(52) U.S. Cl.
CPC .............. *G08G 5/06* (2013.01); *G08G 5/0026* (2013.01); *G05D 1/0083* (2013.01); *B64F 1/002* (2013.01); *G06F 17/10* (2013.01); *G08G 5/065* (2013.01)
USPC .................... 701/120; 701/3; 701/301; 703/2; 342/29

(58) Field of Classification Search
CPC ....... G08G 5/06; G08G 5/065; G08G 5/0026; G05D 1/0083; B64F 1/002; G06F 17/10
USPC ............ 701/3, 120, 300, 301; 703/2; 342/29, 342/36; 340/958
See application file for complete search history.

(56) References Cited

U.S. PATENT DOCUMENTS

| | | | | |
|---|---|---|---|---|
| 7,990,307 | B1 | 8/2011 | Lopez | |
| 8,095,300 | B2* | 1/2012 | Villaume et al. | ............. 701/121 |
| 8,140,257 | B2* | 3/2012 | Villaume et al. | ............. 701/467 |
| 8,160,756 | B2* | 4/2012 | Villaume et al. | ................. 701/7 |
| 8,271,184 | B2* | 9/2012 | Gayraud et al. | ............. 701/120 |
| 8,280,562 | B2* | 10/2012 | Villaume et al. | ................. 701/3 |
| 2010/0052973 | A1* | 3/2010 | Fabre et al. | ..................... 342/30 |
| 2011/0257873 | A1 | 10/2011 | Lussiez et al. | |

FOREIGN PATENT DOCUMENTS

EP   2378460 A1   10/2011

OTHER PUBLICATIONS

Chen et al., Comparisons of Multipath Modeling Strategies for the Estimation of GPS Positioning Error, 3rd European Conference on Antennas and Propogation, Mar. 23-27, 2009, Berlin Germany, IEEE, Piscataway, NJ, USA, pp. 2300-2304, XP031470250.

* cited by examiner

*Primary Examiner* — Russell Frejd
(74) *Attorney, Agent, or Firm* — Lerner, David, Littenberg, Krumholz & Mentlik, LLP

(57) ABSTRACT

An assist device for ensuring the accuracy and integrity of position information of an aircraft on the ground includes a processing unit for determining in the airport (AE) a zone (ZP) of insensitivity to multipath GPS signals, the zone (ZP) having a rectangular shape, which is determined relative to the threshold (O) of the runway, and which has a length ($L_1$) equal to the length of the runway and a width ($L_2$) depending on a maximum illumination distance (D). The device further includes a unit for verifying, while the aircraft is moving in the airport (AE), whether the position relative to position information of the aircraft is inside said runway zone (ZP). A method for ensuring the accuracy and integrity of position information of an aircraft on the ground is also disclosed herein.

13 Claims, 2 Drawing Sheets

METHOD AND DEVICE FOR ENSURING THE ACCURACY AND THE INTEGRITY OF AN AIRCRAFT POSITION ON THE GROUND

FIELD OF THE INVENTION

The present invention relates to a method and an assist device for ensuring the accuracy and integrity of position information of an aircraft, in particular a transport aircraft, rolling on the ground in an airport.

BACKGROUND OF THE INVENTION

In general, the positioning system of an aircraft (while on the ground and in flight) is based in particular on a satellite positioning system, specifically a GPS type system ("Global Positioning System" in English).

In this case, the message is superimposed on a code that contains the time reference. The synchronization of signals is obtained through atomic clocks on board of each satellite. The receiver compares the shift between the received signal and the locally generated signal in the receiver and measures in this way the distance of the corresponding satellite. These measurements are repeated for all satellites, from which signals are received and used to continuously calculate the position.

Regardless of the system used (low or geostationary constellation or local beacon), each distance measurement places the receiver on a sphere centered on the transmitter. By using at least three transmitters, these spheres have a single intersection point. However, this simple principle becomes complicated because:
- the local clock of the receiver is rarely of atomic precision: only the time differences are accurate, which requires four beacons or satellites instead of three to determine a point (if the altitude is known, three beacons are sufficient);
- the receivers are mobile, and the measurements are carried out at different points, and
- the speed of radio waves varies slightly depending on the traversed ionospheric layers.

Therefore, the receiver integrates these various errors, using corrections and measurements of various satellites or beacons, followed by integration techniques such as filtering with Kalman filters to obtain the most probable point and its estimated accuracy, speed and universal time.

For applications requiring absolute safety of the point (landing without visibility, anti-collision, . . . ), the navigation signals are supplemented by a so-called "integrity" signal that eliminates any measurement coming from a transmitter that is temporarily or long term out of order. The integrity is a measure of the confidence that the user has in the quality of the system outputs.

Today, position calculation means are used based on hybridizations between GPS data and aircraft inertial data. The hybridization consists in cushioning or stabilizing divergent errors of an inertial navigation station thanks to a position measurement resulting from GPS data. In the Kalman filter, the GPS data is used to estimate the positioning error of IRS type inertial systems ("Inertial Reference System" in English) and to estimate the position in more accurate manner.

In some solutions, there is a main filter which provides one main GPIRS point estimated using N possible satellites and N−1 secondary filters each using a subset of satellites. The bank of Kalman sub-filters performs a detection and exclusion function of a FDE type satellite failure ("Fault Detection and Exclusion" in English).

For ground navigation, the emphasis is on accuracy and in general banks of sub-filters are not employed. The estimated position is therefore a GPIRS position calculated with all known errors or a position with guaranteed accuracy of 95%.

This position can often be completed by retiming of the augmented GPS points in order to improve the GPS guaranteed precision to 95%. The goal of the GPIRS calculated on the ground is not to degrade in any case the accuracy provided by the GPS, but to provide continuity in the event of GPS signal masking or non-availability of GPS signals.

In contrast, the main filter and the N−1 secondary filters are used for the flight. The recognized confidence factor is estimated at $10^{-7}$, which means that the probability of the estimated GPIRS point being outside an integrity protection radius is smaller than $10^{-7}$.

The confidence level is estimated by assuming that the GPIRS position calculated by an electronic entity has a confidence level of only $10^{-5}$, or a factor of ten relative to the error probability of an electronic entity, or $10^{-6}$. It is then assumed that the GPIRS data supplied by a number of N redundancies raises the confidence factor from $10^{-5}$ to $10^{-7}$ through consolidation of the calculated data and exclusion of erroneous data if the number of redundancies is sufficient (minimum 3 for exclusion).

Moreover, we know that the positioning system of an aircraft using a satellite positioning system, specifically a GPS type, as mentioned above, is subject on the ground to so-called multipath phenomena that disrupt the accuracy of the position measurement, so that the obtained GPS position is no longer accurate enough, or a hybrid position calculated starting from such a GPS position has insufficient integrity, to allow its use on the ground.

Indeed, when the signal emitted by a satellite encounters an obstacle, currents are generated on the obstacle, which emits radiation in return. This principle is called electromagnetic diffraction. According to this definition, the term diffraction includes all interaction phenomena such as reflection, diffraction by edges, transmission and masking for instance. In the context of positioning through GPS data, electromagnetic fields diffracted by obstacles in the vicinity of the receiver antenna, such as for instance buildings, are transformed into echo signals called multipath signals. In the presence of such multipath signals, the estimation of the propagation delay between the satellite and the receiver may be degraded and the resulting position may be less accurate.

Furthermore, it is known that some recent functions require aircraft to provide also on the ground an integrity position to ensure quick turns after landing or to navigate in complex airports with a level of confidence in the position. Because of the multipath problems presented above, a position or confidence in the position of the aircraft cannot be guaranteed, because the signals are no longer guaranteed.

BRIEF SUMMARY OF THE INVENTION

Various aspects of the present invention relate to remedying these disadvantages. An aspect of the present invention relates to an assist method for ensuring the accuracy of position information of an aircraft, in particular a transport aircraft, rolling on the ground in an airport, which remedies the aforementioned disadvantages.

To this end, according to an aspect of the invention, said method is characterized in that at least for one runway of the airport, the following operations are performed:

receive information relative to the runway;
determine a maximum distance of sensitivity to multipath type electromagnetic illumination, in function at least of the height of the buildings on the airport;
based on said information and said maximum distance, determine a runway zone with rectangular shape, which is determined relative to the runway threshold, and which has a length equal to the length of the runway and a width depending on said maximum distance; and
when the aircraft is rolling in the airport, the following operations are performed, in automatic and repetitive manner:
receive a position information of the aircraft;
check whether the position relative to this position information is inside said runway zone.

More specifically, this rectangle is centered relative to the runway so that the threshold of the runway is located, longitudinally at the upstream edge of the rectangle, and laterally in the center of the width.

Therefore, a zone of the airport called runway zone, which is defined as the runway likely of being taken by the aircraft, may be determined for which there is no risk for a sensor mounted on the aircraft and relative to a satellite positioning system, in particular a GPS type system (but not exclusively), of being subjected to multipath type electromagnetic illumination. This provides positional information (generated by such a satellite positioning system) which is not perturbed by multipath phenomena and which is therefore very accurate. Starting from this position information (as well as the usual inertial data), a hybrid position with high integrity can be generated, as specified below.

Advantageously, the maximum distance of sensitivity to multipath type electromagnetic illumination is determined in function, among others, of the height from the ground of an antenna, mounted on the aircraft, receiving signals from a satellite positioning system, when the aircraft is on the ground.

In a preferred implementation mode, said maximum distance D is calculated with the following expression:

$$D = (H1 - H2)/tg\alpha$$

in which:
H1 is the maximum height of the buildings on the airport;
H2 is the height from the ground of an antenna mounted on the aircraft, receiving signals from a satellite positioning system, for the aircraft located on the ground;
tg denotes the tangent, and
α is a masking angle.

Advantageously, said width $L_2$ is determined by means of the following relationship:

$$L_2 = 2(\gamma - D)h$$

in which:
γ represents the minimum distance of the runway relative to the airport buildings, and
D represents said maximum distance.

Moreover, in a particular implementation mode, a global runway zone is determined, with rectangular shape, which encompasses several runway zones relative to adjacent runways of the airport and substantially parallel. If the position (relative to the position information) is located within said runway zone, a GPS type position information (which is then accurate) can be used, in the current position of the aircraft, either individually, or for calculating a hybrid position with high integrity. It is thus possible to guarantee, in said runway zone, a level of confidence in the GPIRS ground hybrid position of $10^{-7}$.

Advantageously, to verify whether position M relative to a position information is within said runway zone, the following conditions are verified:

$$\begin{cases} 0 \leq \vec{OM} \cdot \vec{u}_x \leq L_1 \\ -L_2/2 \leq \vec{OM} \cdot \vec{u}_y \leq L_2/2 \\ \vec{OM} \cdot \vec{u}_z = 0 \end{cases}$$

which must be satisfied simultaneously and in which:
$(O, \vec{u}_x, \vec{u}_y, \vec{u}_z)$ is a local orthonormal basis linked to the rectangle forming said runway zone, while O represents the threshold of the runway;
$L_1$ is the length of said rectangle, and
$L_2$ is the width of said rectangle.

Furthermore, the method according to an aspect of the invention helps ensure the integrity of position information of an aircraft rolling on the ground in an airport.

To this end, advantageously, if the aircraft is inside said runway zone, a position information of the aircraft is used, generated by a satellite positioning system, preferably a GPS type system, as well as inertial data of the aircraft, to determine a hybrid position (GPIRS) of said aircraft, whereby said runway zone represents an integrity zone with predetermined integrity.

Furthermore, advantageously, to increase said integrity zone of the airport, the following operations are carried out on board the aircraft:
determining an auxiliary position of the aircraft, by means of an auxiliary element for generating position, which is at least partially on-board;
determining at least one auxiliary hybrid position by means of inertial data and said auxiliary position, and
using this hybrid auxiliary position at least outside of said runway zone in order to increase the integrity zone of the airport.

Preferably, said auxiliary element generating position comprises at least one of the following on-board means:
an odometer;
a video system;
a magnetic sensor system, and
a passive antenna.
In this way:
inside the runway zone, said hybrid GPIRS position with high integrity is used, and
outside said runway zone, said hybrid auxiliary position is used.

An embodiment of the present invention also relates to an assist device ensuring the accuracy of a position information of an aircraft, in particular a transport aircraft, rolling on the ground in an airport.

According to an embodiment of the invention, said device is characterized in that it comprises:
means for receiving information relative to the runway;
means for determining a maximum distance of sensitivity to multipath type electromagnetic illumination, in function at least of the height of the buildings on the airport;
means for determining, by means of said information and said maximum distance, a runway zone with rectangular shape, which is determined relative to the runway threshold, and which has a length equal to that of the runway and a width dependent on said maximum distance, and means for checking, in automatic and repetitive manner, when the aircraft is rolling in the airport, if the position relative to position information of the aircraft is located inside said runway zone.

Moreover, in a particular implementation mode, said device also comprises means for determining a hybrid position of said aircraft, if the aircraft is inside said runway zone, by means of position information of the aircraft, generated by a satellite positioning system, as well as inertial data of the aircraft, whereby said runway zone represents a zone of integrity.

Furthermore, advantageously, it can comprise additionally:
  at least one auxiliary element for determining the auxiliary position of the aircraft, and
  means for determining at least one auxiliary hybrid position by means of inertial data and said auxiliary position.

Another embodiment of the present invention also relates to an aircraft, in particular a transport plane, equipped with a device such as the above described device.

BRIEF DESCRIPTION OF THE DRAWINGS

The figures of the attached drawing will clarify how the invention can be implemented. In these figures, identical references denote similar elements.

DETAILED DESCRIPTION

Figure 1:
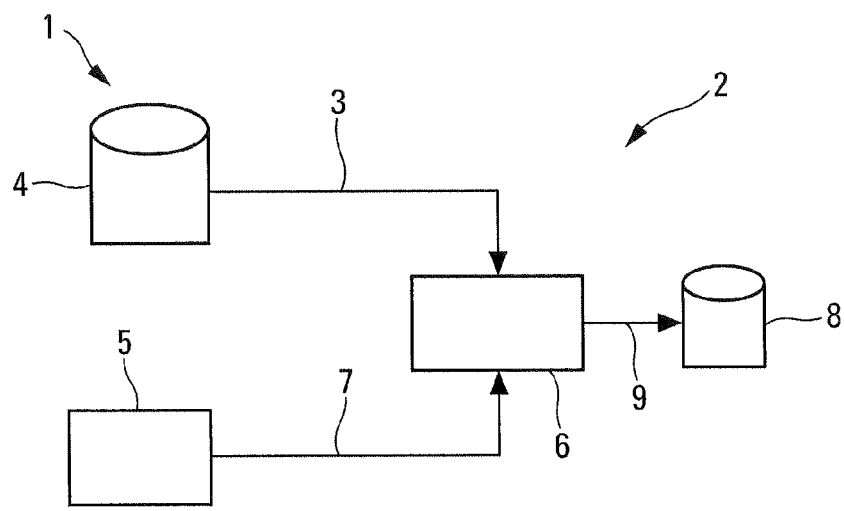
FIGS. 1, 4 and 5 are block diagrams of the particular means of a device according to an embodiment of the invention.
Figure 4:
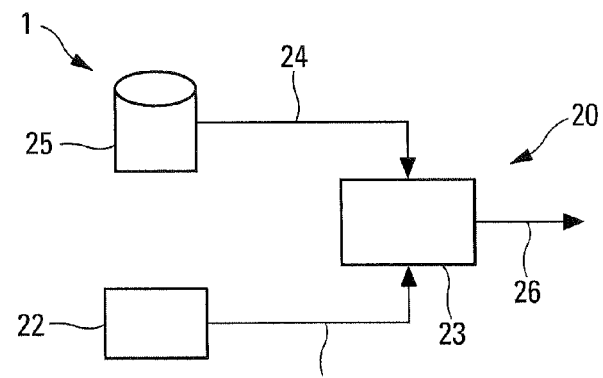
Figure 5:
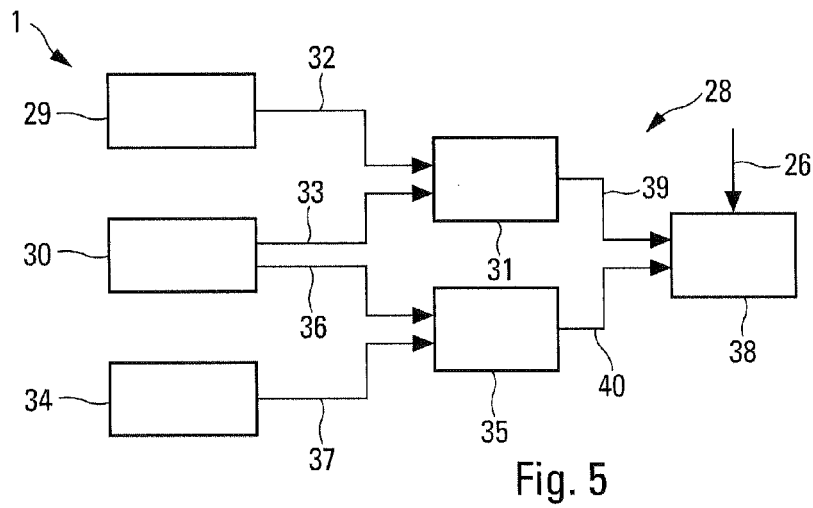

The goal of device 1 according to an embodiment of the invention and shown schematically in FIGS. 1, 4 and 5 is to help ensure the accuracy of position information of an aircraft (not shown), in particular of a transport aircraft, rolling on the ground in an airport AE. More specifically, its main goal is to define a zone of insensitivity to multipath signals, called runway zone ZP.

To this end, said device 1 according to an embodiment of the invention, comprises a processing unit 2 for determining on the ground before a flight at least one runway zone ZP which is relative to a runway of an airport AE. To this end, said processing unit 2 includes, as shown in FIG. 1:
  means, in this case a connection 3, for receiving information relative to the runway, specified below, in particular from a conventional database 4 containing such information;
  means 5 for determining a maximum distance D of susceptibility to multipath type electromagnetic illumination, in function at least of the height of the buildings 10 of airport AE;
  means 6 which are connected through the intermediary of connections 3 and 7 to said means 4 and 5 and which are formed so as to determine, by means of said information and said maximum distance D, a runway zone ZP;
  means 20 for verifying, in automatic and repetitive manner, when the aircraft is rolling in the airport AE, if the position relative to the position information of the aircraft is located inside said runway zone ZP.

In a preferred implementation mode, means 5 determine the maximum distance D of sensitivity to multipath type electromagnetic illumination, in function also of the height relative to the ground of an antenna mounted on the aircraft, receiving signals from a satellite positioning system, when the aircraft is on the ground.

According to an embodiment of the invention, a runway zone ZP of simple geometry is defined, in the airport environment, which is a zone in which the GPS signals received by an antenna of the aircraft are not subject to multipath type interference. To do this, each point of this runway zone ZP must be farther away than the distance D of the buildings 10 of airport AE.

Figure 2:
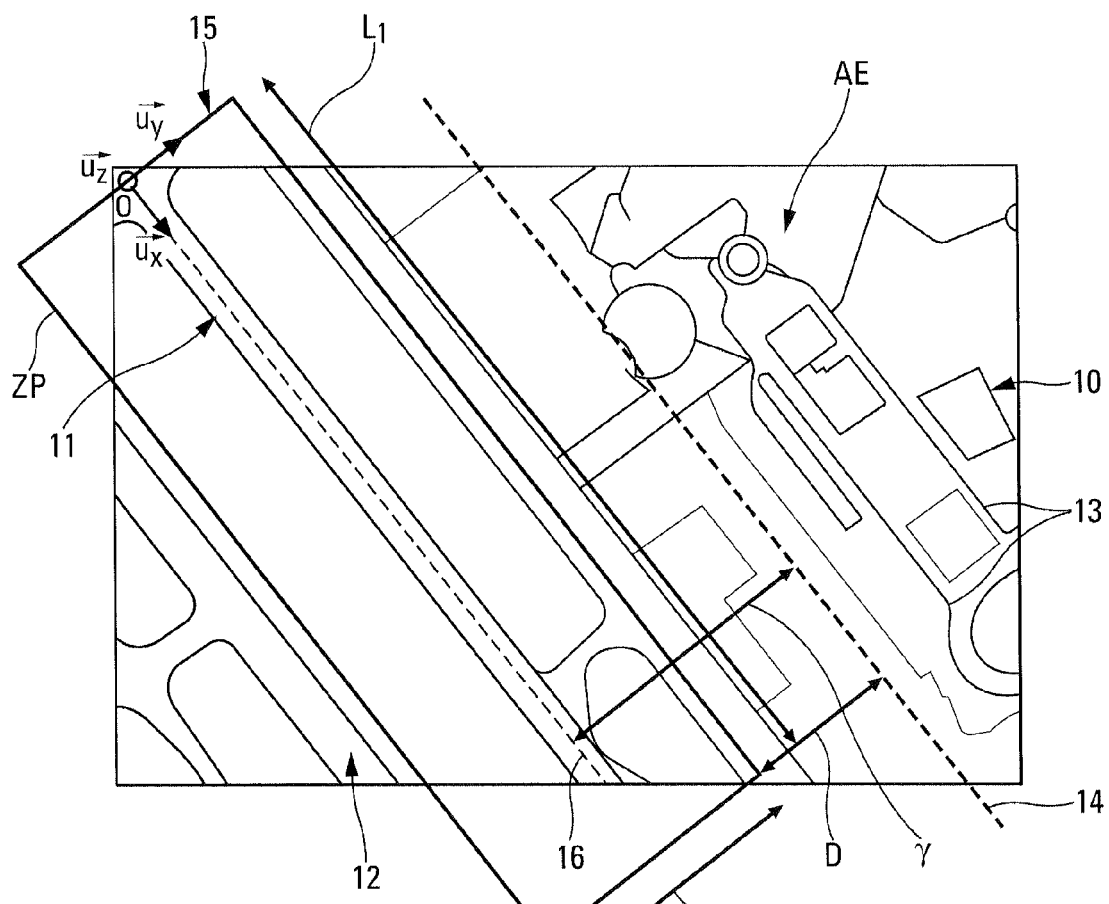
FIG. 2 is a schematic plan view of an airport used to explain the characteristics of a runway zone according to the invention.

According to an embodiment of the invention, this runway zone ZP is defined with respect to a runway 11 of the airport, in other words a part of the airport in which an aircraft can move. This runway zone ZP has a rectangular shape, which is determined relative to the threshold O of the runway 11 in question, and which has, as shown in FIG. 2, a length $L_1$ equal to the length of the runway 11 and a width $L_2$ specified below. This FIG. 2 schematically shows a part of an airport AE, provided with runway 11 and another runway 12 and buildings 10, of which the contours are highlighted by a simplified general outline 13.

Width $L_2$ is determined starting from a parameter $\gamma$ representing the minimum distance from the center 16 of runway 11 relative to buildings 10 of airport AE, as illustrated by a dashed line 14 in FIG. 2. This parameter $\gamma$ can be determined in conventional manner. According to an aspect of the invention, the width $L_2$ satisfies the following relationship: $L_2=2(\gamma-D)$.

This rectangular runway zone ZP is positioned so that the threshold O of runway 11 is located longitudinally at the upstream edge 15 of the rectangle, and laterally in the center of the width. Laterally, the runway zone is therefore centered relative to the central axis 16 of runway 11.

In this way, said processing unit 2 is capable of determining a zone of the airport, called runway zone ZP, which is defined as a runway 11 likely of being traversed by the aircraft, for which there is no risk for a detector, relative to a GPS type satellite positioning system and mounted on the aircraft, of being subjected to multipath type electromagnetic illumination. As explained below, this allows for obtaining positional information (generated by such a satellite positioning system) that is not perturbed by multipath phenomena and which is therefore very accurate. This also allows for generating starting from this position information (and the usual inertial data), a hybrid position with high integrity.

Preferably, the processing unit 2 determines a runway zone ZP for each of the runways of airport AE. It is also possible to determine a global rectangular shaped runway zone that encompasses several runway zones relative to adjacent runways on the airport and preferably substantially parallel.

A runway zone ZP and the information for determining it can be stored in a database 8 (via a connection 9). Preferably, this database 8 is a conventional on-board database containing runway information. This database 8 can contain runway zones associated to all runways of different airports, for which said database 8 contains information.

In a preferred implementation mode, said means 5 calculate said maximum distance D by means of the following expression:

$$D=(H1-H2)/tg\alpha$$

in which:
  H1 is the maximum height of buildings 10 on the airport AE;

H2 is the height from the ground of an antenna, mounted on the aircraft, receiving signals from a satellite positioning system, when the aircraft is located on the ground;

tg is the tangent; and

α is the conventional GPS masking angle, in other words, the minimum reception angle of GPS signals that a receiver takes into account.

Figure 3:
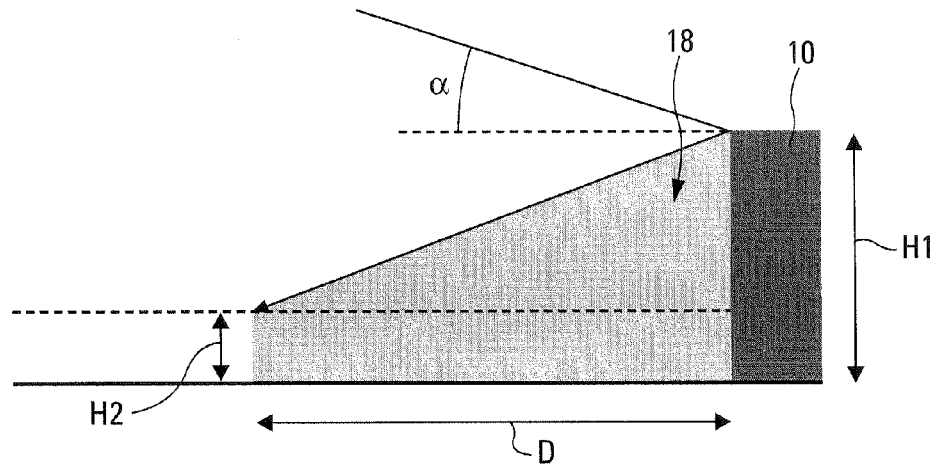
FIG. 3 is a schematic view used to explain a method for calculating the maximum distance of sensitivity to multipath signals.

D is therefore the maximum distance illuminated by a reflection of the first order in function of the height of the obstacle, in this case airport buildings 10, as shown in FIG. 3, which shows the previous parameters. In this FIG. 3, the illuminated zone 18 (in other words, the zone subject to multipath signals) is shown in light gray.

As an illustration, for an A350 type aircraft, the height H2 of the antenna above the ground is about 10 meters, and if we consider a maximum height of buildings 10 on the airport AE of 40 meters and a masking angle of 5°, we obtain by means of the above equation a distance D of 342 meters. Of course, the larger the aircraft (and therefore the greater height H2), the more distance D is reduced.

In addition, the device 1 according to an embodiment of the invention also comprises a unit 20 shown schematically in FIG. 4, which is on board an aircraft and which is intended to verify if the aircraft is in a runway zone ZP of airport AE as defined above, while rolling on the ground.

To this end, unit 20 includes:

means, in this case a connection 21, for receiving position information of the aircraft, from the means for generating position 22, in particular from a GPS receiver;

means 23 which are connected through the intermediary of connections 21 and 24 to said means 22 and to a database 25 (which corresponds for instance to database 8 of FIG. 1 and which contains information for defining the runway zone ZP of the used runway 11). These means 23 are formed so as to verify, in automatic and repetitive manner, when the aircraft travels on the runway 11, if the position relative to position information received from the means 22 is located within said ZP runway zone.

If this is the case, a unit 28 of device 1 can use position information from a GPS receiver 29 which is then accurate, because not subject to multipath signals. This position information of receiver 29 can be used either individually or, as shown in FIG. 5, for calculating a hybrid GPIRS position which then has high integrity.

In this last case, this unit 20 includes, in addition to said GPS receiver 29:

conventional means 30, in particular IRS type inertial reference systems for generating inertial information, and means 31 which are connected through the intermediary of connections 32 and 33 respectively to said means 29 and 30 and which are formed so as to generate, in the usual manner, a GPIRS type hybrid position.

It is thus possible to ensure, in said ZP zone of the runway, a confidence factor of $10^{-7}$ of the GPIRS hybrid ground position.

In this case, the following assumptions are taken into account:

the GPIRS data supplied by a number of N redundancies raises the confidence level from $10^{-5}$ to $10^{-7}$ by consolidating the calculated data and excluding erroneous data if the number of redundancies is sufficient (minimum 3 for exclusion);

the multipath signals due to other planes are negligible and even more negligible with greater dynamics of the carrier which implements these algorithms (invisible phenomenon); and the main configuration of the movement of the aircraft relative to other aircraft is one behind the other and not adjacent to one another.

Furthermore, to verify whether the position M relative to position information (received from means 22) is located inside said runway zone ZP, means 23 carry out the following checks:

$$M \in P \Leftrightarrow \begin{cases} 0 \leq \vec{OM} \cdot \vec{u}_x \leq L_1 \\ -L_2/2 \leq \vec{OM} \cdot \vec{u}_y \leq L_2/2 \\ \vec{OM} \cdot \vec{u}_z = 0 \end{cases}$$

for which, as shown in FIGS. 2:

$(O, \vec{u}_x, \vec{u}_y, \vec{u}_z)$ is a local orthonormal basis linked to the rectangle forming said runway zone ZP, while O represents the threshold of runway 11;

$L_1$ is the length of said rectangle, and $L_2$ is the width of said rectangle.

The three preceding conditions must be met simultaneously for means 23 to ensure that the position M is located within said runway zone ZP. By noting $(x_M, y_M, z_M)$ the coordinates of M in the usual coordinate system WGS84 (Og, ugx, ugy, ugz), for instance the GPS position of the aircraft, we obtain:

$$M \in P \Leftrightarrow \begin{cases} 0 \leq (x_M \vec{u}_{gx} + y_M \vec{u}_{gy} + z_M \vec{u}_{gy}) \cdot \vec{u}_x \leq L_1 \\ -L_2/2 \leq (x_M \vec{u}_{gx} + y_M \vec{u}_{gy} + z_M \vec{u}_{gy}) \cdot \vec{u}_y \leq L_2/2 \\ (x_M \vec{u}_{gx} + y_M \vec{u}_{gy} + z_M \vec{u}_{gy}) \cdot \vec{u}_z = 0 \end{cases}$$

With $(\alpha_1, \alpha_2, \alpha_3)$ the coordinates of local vector $\vec{u}_x$ in the coordinate system WGS84, $(\beta_1, \beta_2, \beta_3)$ the coordinates of the local vector $\vec{u}_y$ in the coordinate local and WGS84 and $(\gamma_1, \gamma_2, \gamma_3)$ the coordinates of the local vector $\vec{u}_z$ in the coordinate system WGS84, we obtain:

$M \in P \Leftrightarrow$ $$\begin{cases} 0 \leq (x_M \vec{u}_{gx} + y_M \vec{u}_{gy} + z_M \vec{u}_{gy}) \cdot (\alpha_1 \vec{u}_{gx} + \alpha_2 \vec{u}_{gy} + \alpha_3 \vec{u}_{gz}) \leq L_1 \\ -L_2/2 \leq (x_M \vec{u}_{gx} + y_M \vec{u}_{gy} + z_M \vec{u}_{gy}) \cdot (\beta_1 \vec{u}_{gx} + \beta_2 \vec{u}_{gy} + \beta_3 \vec{u}_{gz}) \leq L_2/2 \\ (x_M \vec{u}_{gx} + y_M \vec{u}_{gy} + z_M \vec{u}_{gy}) \cdot (\gamma_1 \vec{u}_{gx} + \gamma_2 \vec{u}_{gy} + \gamma_3 \vec{u}_{gz}) = 0 \end{cases}$$

or finally:

$$M \in P \Leftrightarrow \begin{cases} 0 \leq x_M \alpha_1 + y_M \alpha_2 + z_M \alpha_3) \leq L_1 \\ -L_2/2 \leq (x_M \beta_1 + y_M \beta_2 + z_M \beta_3 \leq L_2/2 \\ (x_M \gamma_1 + y_M \gamma_2 + z_M \gamma_3) = 0 \end{cases}$$

This last expression provides three conditions, for which all parameters are known, so that means 23 can verify that the position M is located within said runway zone ZP.

The orientation of the runway can be given with respect to the true north ("True North reference" in English) or Magnetic North ("Magnetic North Reference" in English), in function of the local correction to be applied in relation to local magnetic drifts.

The device 1 according to an embodiment of the invention helps ensure the integrity of a hybrid position of an aircraft moving on the ground in an airport, if the aircraft is within the runway zone ZP, as defined above, which represents in this case a zone of integrity, in other words a zone where integrity is high and sufficient to allow for the use of the aircraft position.

Furthermore, to increase this zone of integrity of the airport, said unit 28 of device 1 can comprise, in addition, as shown in FIG. 5:
- at least one auxiliary element 34, described below, for determining an auxiliary position of the aircraft;
- means 35 which are connected through the intermediary of connections 36 and 37 respectively to said means 30 and 34 and which are formed so as to determine at least one auxiliary hybrid position by means of inertial data received from said means 30 and said auxiliary position.

This helps ensure the integrity of the position on the ground thanks to one or different means 30 receiving the GPS signal potentially tainted with multipath signals, especially in a zone of multipath signals 18.

Said device 1 can use this auxiliary hybrid position at least outside of said runway zone ZP so as to increase the overall integrity zone of the airport. In the following is designated by auxiliary hybridization, the hybridization implemented by means 35 and generating said auxiliary hybrid position.

To this end, said unit 28 can comprise, in addition, means 38 which are connected through the intermediary of connections 39 and 40 respectively to said means 31 and 35 and which are formed so as to select;
- when the aircraft is located inside the runway zone ZP (information received from means 23 via a connection 26), said GPIRS hybrid position which then has a high integrity, and
- outside the runway zone ZP, said hybrid auxiliary position.

We can define a cycle of the aircraft comprising all successive steps: gate, takeoff, flight, landing, and docking at the gate. Depending on the initial state of the aircraft (continuous cycle or turned off aircraft, starting for the first time and initiating a cycle), said auxiliary hybridization requires an initial condition, in order to increment and to know at every moment an accurate position, with integrity, of the aircraft. In this way:
- in the case of take-off, when necessary at the beginning of a cycle, the initial condition is provided:
  - either by a third party system (for instance, a flight management system), namely the position of the gate, which is always known in the case of the take-off phase. Preferably, this position can be known through data included in a database;
  - or by a computer having stored the last previously known reference position, and
- when the aircraft is not turned off, it is possible to reuse the integrity position known since stopping the aircraft at the gate, and starting from this accurate position, with integrity, initializing the position for the next cycle.

Preferably, said auxiliary member 34 generating the position comprises at least one of the following on-board means:
- a mechanical or electrical odometer: which is arranged on the front wheel of the aircraft. This odometer measures the exact number or revolutions of the wheel in order to know, starting from an initial condition of position, the exact position of the aircraft on runway 11 at any time. Complemented by orientation measurements of the nose of the aircraft and orientations of the wheel, of transverse IRS displacements for the slips and rotations of the front gear, we obtain in the usual manner a position that is accurate and with integrity. This measurement allows, upon hybridization with IRS data, for correction of the IRS bias and for providing an integrity position independent of the GPS signals in the multipath zone. These measurements may be distorted due to changes in the circumference of the tire (wear in particular). Also, preferably, a verification of the rotation and/or automatic control relative to the speed (ground speed supplied by the IR data, for instance) is foreseen to detect any problem related to tire circumference change;
- a video system based on the analysis of the airport AE surface. A camera located under the belly of the aircraft can, in this case, retrieve information from the surface, in particular lines drawn on the ground or reference points, of which the precise GPS reference is known;
- a magnetic sensor system, which is arranged under the main gear of the aircraft and is used to measure a known position of one or more points of the runway 11 or of the access ramps, and
- a passive antenna, which is excited by an electromagnetic field (antenna placed in the tarmac itself) of which the position is known accurately and with integrity.

These auxiliary elements 34 can be coupled then to means 30 to provide an accurate and integrity position of the aircraft in any point of the airport, either during the take-off phase or during the landing phase.

Time intervals may exist, for which the two hybrid calculation means are available. In this case, to switch from one source of confidence position to another:
- during the takeoff phase, the condition of validity of the previously described runway zone ZP must be used and confirmed within a predetermined time;
- during the landing phase, several solutions are possible, and switching from one to the other source of calculation is possible in function of the availability of equipment and/or algorithms:
  - either we let the flight position issued from the GPIRS flight algorithm continue to be calculated for a predetermined time after touchdown (the touchdown information is provided by the processor of the landing gear which informs of the compressed state of the landing gear) and a switch is made to the ground hybridization means;
  - or we await a validity criterion (change from calculation data status to operational status) of the hybridization calculation with the ground means, confirmed during a predetermined time.
  - or the geometric calculation of the above described zone ZP is available.

An aspect of the present invention allows therefore for determining a runway zone ZP, in which a confidence factor of $10^{-7}$ can be guaranteed of the hybrid GPIRS ground position. The flight integrity algorithm is used in this way each time the conditions for supplying this confidence factor are satisfied. In alternative and complementary manner, the flight integrity algorithm can be used at any time that the aircraft is on the ground if ground means or on-board means of the aircraft are used to obtain GPS signals.

The invention claimed is:

1. A method for ensuring the accuracy of position information of an aircraft rolling on the ground in an airport, comprising:
   receiving information relative to at least one runway;
   determining a maximum distance (D) sensitive to multipath type electromagnetic illumination, in function at least of the height of the buildings on the airport;

determining by said information and said maximum distance (D), a runway zone (ZP) with rectangular form relative to the threshold (O) of runway, and having a length ($L_1$) equal to that of the runway and a width ($L_2$) depending on said maximum distance (D); and during the travel of the aircraft in airport (AE), automatically and repetitively:

receiving position information of the aircraft; and verifying whether the aircraft position is inside said runway zone (ZP).

2. The method according to claim 1, wherein the maximum distance (D) of sensitivity to multipath type electromagnetic illumination is determined furthermore in function of the height relative to the ground of an antenna, mounted on the aircraft, receiving signals from a satellite positioning system, when the aircraft is on the ground.

3. The method according to claim 2, wherein said maximum distance (D) is calculated by the following expression:

$$D=(H1-H2)/tg\alpha$$

in which:

H1 is the maximum height of the buildings on the airport (AE);

H2 is the height from the ground of an antenna mounted on the aircraft, receiving signals from a satellite positioning system, when the aircraft is located on the ground;

tg denotes the tangent, and $\alpha$ is a masking angle.

4. The method according to claim 1, wherein said length $L_2$ is determined by the following relationship:

$$L_2=2(\gamma-D)$$

in which:

$\gamma$ represents the minimum distance from the center of the runway to the buildings of airport (AE), and D represents said maximum distance.

5. The method according to claim 1, wherein a rectangular shaped global runway zone is determined, which encompasses a plurality of zones of the runway relative to an adjacent runway of the airport (AE).

6. The method according to claim 1, wherein to verify whether position M relative to a position information is located inside said zone (ZP) of the runway, the following conditions are verified:

$$\begin{cases} 0 \leq \vec{OM} \cdot \vec{u}_x \leq L_1 \\ -L_2/2 \leq \vec{OM} \cdot \vec{u}_y \leq L_2/2 \\ \vec{OM} \cdot \vec{u}_z = 0 \end{cases}$$

which must be satisfied simultaneously and in which:

$(O, \vec{u}_x, \vec{u}_y, \vec{u}_z)$ is a local orthonormal base linked to the rectangle forming said runway zone (ZP) representing said zone of the runway, while O represents the threshold of the runway;

$L_1$ is the length of said rectangle, and $L_2$ is the width of said rectangle.

7. The method according to claim 1, to ensure the integrity of position information of an aircraft moving on the ground at an airport (AE), wherein if the aircraft is inside said runway zone (ZP), a position information of the aircraft is used, generated by a satellite positioning system, together with inertial data of the aircraft, to determine a hybrid position of said aircraft, whereby said runway zone (ZP) represents an integrity zone with predetermined integrity.

8. The method according to claim 7, for increasing said integrity zone of the airport, further comprising:

an auxiliary position of the aircraft is determined, by an auxiliary element for generating position, which is at least partially on-board;

at least an auxiliary hybrid position is determined by inertial data and said auxiliary position; and the auxiliary hybrid position is used at least outside said runway zone (ZP) to increase the integrity zone of the airport.

9. The method according to claim 8, wherein said auxiliary element for generating position comprises at least one of the following on-board means:

an odometer;

a video system;

a magnetic sensor system, and a passive antenna.

10. An assist device for ensuring the accuracy of position information of an aircraft moving on the ground in an airport (AE), the device comprising:

means for receiving information relative to the runway;

means for determining a maximum distance (D) of sensitivity to multipath type electromagnetic illumination, in function at least of the height of the buildings on the airport (AE);

means for determining, by said information and said maximum distance (D), a runway zone (ZP) with rectangular shape determined relative to the threshold (O) of the runway, and having a length ($L_1$) equal to the length of the runway and a width ($L_2$) depending on said maximum distance (D); and means for verifying, in automatic and repetitive manner, while the aircraft is moving in the airport (AE), whether the position relative to a position information of the aircraft is inside said runway zone (ZP).

11. The device according to claim 10, further comprising means for determining a hybrid position of said aircraft, if the aircraft is located inside said runway zone (ZP), by position information of the aircraft, generated by a satellite positioning system, and inertial information of the aircraft.

12. The device according to claim 10, further comprising:

at least one auxiliary element for determining an auxiliary position of the aircraft; and means for determining at least one auxiliary hybrid position by means of inertial data and said auxiliary position.

13. An aircraft comprising an assist device, the assist device comprising:

means for receiving information relative to the runway;

means for determining a maximum distance (D) of sensitivity to multipath type electromagnetic illumination, in function at least of the height of the buildings on the airport (AE);

means for determining, by said information and said maximum distance (D), a runway zone (ZP) with rectangular shape determined relative to the threshold (O) of the runway, and having a length ($L_1$) equal to the length of the runway and a width ($L_2$) depending on said maximum distance (D); and means for verifying, in automatic and repetitive manner, while the aircraft is moving in the airport (AE), whether the position relative to a position information of the aircraft is inside said runway zone (ZP).

* * * * *

UNITED STATES PATENT AND TRADEMARK OFFICE
CERTIFICATE OF CORRECTION

PATENT NO. : 8,880,325 B2  Page 1 of 1
APPLICATION NO. : 13/654569
DATED : November 4, 2014
INVENTOR(S) : Jean-Damien Perrie, Philippe Gmerek and Adrien Chen It is certified that error appears in the above-identified patent and that said Letters Patent is hereby corrected as shown below:

In the Claims

Column 11, line 4, "($L_1$)" should read -- ($L_1$) --; "($L_2$)" should read -- ($L_2$) --.
Column 11, line 21, "H1" should read -- $H1$ --.
Column 11, line 23, "H2" should read -- $H2$ --.
Column 11, line 27, "tg" should read -- $tg$ --.
Column 11, line 59, "($L_1$)" should read -- ($L_1$) --.
Column 11, line 60, "($L_2$)" should read -- ($L_2$) --.
Column 12, line 32, "($L_1$)" should read -- ($L_1$) --.
Column 12, line 33, "($L_2$)" should read -- ($L_2$) --.
Column 12, line 59, "($L_1$)" should read -- ($L_1$) --.
Column 12, line 60, "($L_2$)" should read -- ($L_2$) --.

Signed and Sealed this
Ninth Day of February, 2016

Michelle K. Lee
*Director of the United States Patent and Trademark Office*